US 9,200,968 B2

Dec. 1, 2015

(12) United States Patent
Coln et al.

(10) Patent No.: US 9,200,968 B2
(45) Date of Patent: Dec. 1, 2015

(54) ON-CHIP TEMPERATURE SENSOR USING INTERCONNECT METAL

(75) Inventors: Michael Coln, Lexington, MA (US); Alain Valentin Guery, Andover, MA (US); Lejun Hu, Somerville, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 429 days.

(21) Appl. No.: 13/561,711

(22) Filed: Jul. 30, 2012

(65) Prior Publication Data

US 2013/0070805 A1  Mar. 21, 2013

Related U.S. Application Data

(60) Provisional application No. 61/536,795, filed on Sep. 20, 2011.

(51) Int. Cl.
| | |
|---|---|
| G01K 7/00 | (2006.01) |
| G01K 7/16 | (2006.01) |
| G01K 15/00 | (2006.01) |
| G01K 7/18 | (2006.01) |

(52) U.S. Cl.
CPC ............. G01K 7/186 (2013.01); G01K 15/005 (2013.01); *G01K 2217/00* (2013.01); *G01K 2219/00* (2013.01)

(58) Field of Classification Search
CPC ................................. G01K 1/00; G01K 15/00
USPC ............. 374/170–172, 163, 183, 184, 185, 1, 374/178; 327/512, 513; 338/22 R
See application file for complete search history.

(56) References Cited

U.S. PATENT DOCUMENTS

| | | | | |
|---|---|---|---|---|
| 4,825,383 | A | * | 4/1989 | Ory ................................. 702/53 |
| 4,830,514 | A | * | 5/1989 | Begehr et al. ................. 374/178 |
| 5,453,683 | A | * | 9/1995 | Pagano ......................... 324/156 |
| 5,639,163 | A | * | 6/1997 | Davidson et al. ............. 374/178 |

(Continued)

FOREIGN PATENT DOCUMENTS

| | | | | |
|---|---|---|---|---|
| JP | 56033564 | A | * | 4/1981 |
| JP | 01185068 | A | * | 7/1989 |

OTHER PUBLICATIONS

Analog Devices, Inc. "Voltage Output Temperature Sensor with Signal Conditioning," AD22100 Datasheet, Rev. D., Jul. 2004, 12 pages.

*Primary Examiner* — Gail Kaplan Verbitsky
(74) *Attorney, Agent, or Firm* — Kenyon & Kenyon LLP

(57) ABSTRACT

An accurate, cost-efficient temperature sensor may be integrated into an integrated circuit (IC) using common materials as the IC's interconnect metallization. The temperature sensor may include an impedance element having a length of metal made of the interconnect metal, a current source connected between a first set of contacts at opposite ends of the impedance element, and an analog-to-digital converter connected between a second set of contacts at opposite ends of the impedance element. The temperature sensor may exploits the proportional relationship between the metal's resistance and temperature to measure ambient temperature. Alternatively, such a temperature sensor may be used on disposable chemical sensors where the impedance element is made of a common metal as conductors that connect a sensor reactant to sensor contacts. In either case, because the impedance element is formed of a common metal as other interconnect, it is expected to incur low manufacturing costs.

16 Claims, 9 Drawing Sheets

(56) References Cited

U.S. PATENT DOCUMENTS

| | | | |
|---|---|---|---|
| 6,126,311 A * | 10/2000 | Schuh | 374/21 |
| 6,244,744 B1 * | 6/2001 | Calvin | 374/183 |
| 6,704,680 B2 * | 3/2004 | Amick et al. | 702/130 |
| 7,398,063 B2 * | 7/2008 | Blosco et al. | 455/127.1 |
| 8,314,623 B2 * | 11/2012 | Nelson et al. | 324/721 |
| 8,449,181 B2 * | 5/2013 | Rud et al. | 374/185 |
| 8,756,025 B2 * | 6/2014 | Banerjee et al. | 702/63 |
| 2003/0085760 A1 * | 5/2003 | Hirvilampi et al. | 330/124 R |
| 2006/0050463 A1 * | 3/2006 | Hung et al. | 361/103 |
| 2006/0193370 A1 * | 8/2006 | St. Pierre et al. | 374/178 |
| 2011/0086600 A1 * | 4/2011 | Muhammad | 455/120 |

\* cited by examiner

200

100

300

500

700

800

900

1000

1100

ON-CHIP TEMPERATURE SENSOR USING INTERCONNECT METAL

The present invention benefits from priority afforded by U.S. patent application Ser. No. 61/536,795, entitled "On-Chip Temperature Sensor Using Interconnect Metal," filed Sep. 20, 2011, the disclosure of which is incorporated herein in its entirety.

BACKGROUND

The present disclosure relates to temperature sensors.

Modern electronic devices are decreasing in size while increasing in functionality at a rapid rate. As a result, modern electronic devices usually include a large number of electrical components in small areas. The cluster of electrical components can increase the heat produced in the device. Heat produced by the electrical components and other changes in temperature can adversely affect the operation and performance of the device.

Consequently, many electronic devices include temperature sensors to dynamically adjust the operation of the electronic device according to temperature changes. However, conventional temperature sensors usually include additional circuit components that take up valuable space in the electronic device. The additional circuit components can include active circuit components generating heat, which is counterproductive to one of the temperature sensor's purposes. Furthermore, conventional temperature sensors require complex manufacturing steps and/or expensive materials, which can dramatically increase the manufacturing costs of the device.

Thus, there is a need for temperature sensors that can be integrated into electronic devices utilizing a cost efficient manufacturing process.

DETAILED DESCRIPTION

Embodiments of the present invention provide an accurate, cost-efficient temperature sensor using interconnect metallization. The temperature sensor may include an impedance element having a length of metal made of the interconnect metal, a current source connected between a first set of contacts at opposite ends of the impedance element, and an analog-to-digital converter connected between a second set of contacts at opposite ends of the impedance element. The temperature sensor may exploits the proportional relationship between the metal's resistance and temperature to measure ambient temperature. Because the impedance element is formed of a common metal as other interconnect, it is expected to incur low manufacturing costs.

Other embodiments of the present invention provide a temperature sensor for use on disposable devices such as a glucose meter strip or other disposable chemical sensors. The temperature sensor is fabricated on a silicon die or other insulator substrates (e.g., glass, ceramic, etc.) that can be attached to the strip. The temperature sensor includes relatively cheap metallization as compared to other metal used on the strip. Moreover, embodiments of the present invention provide a transparent coding technique.

Figure 1:
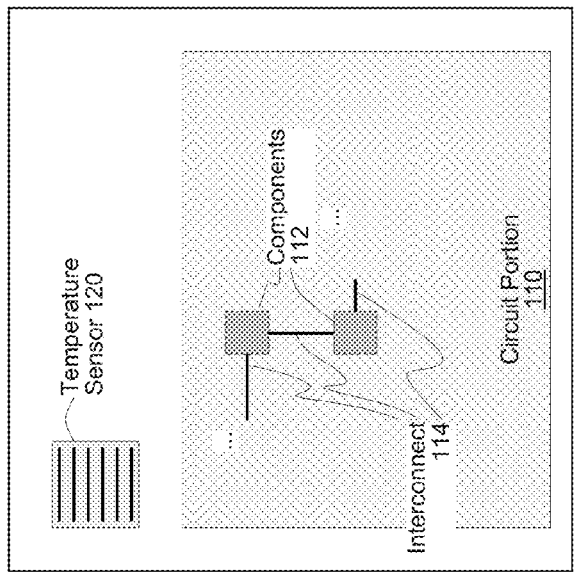
FIG. 1 is a simplified drawing illustrating an electrical device constructed according to an embodiment of the present invention.

FIG. 1 is a simplified drawing illustrating an electrical device 100 constructed according to an embodiment of the present invention. The device 100 may include a circuit portion 110 and a temperature sensor 120. The circuit portion 110 may include a variety of circuit components 112, both active and passive components, that are connected together by interconnects 114. The device 100 may be a unitary device such as a monolithic substrate, an integrated circuit (IC), or a printed circuit board (PCB). The circuit portion 110 and temperature sensor 120 may be provided in sufficient proximity such that heat generated by the components of the circuit portion 110 and heat provided to the circuit portion 110 from ambient sources (not shown) may be captured by the temperature sensor 120.

The architecture and composition of the circuit portion 110 may vary. Typically, the components 112 that constitute the circuit portion 110 will include an array of active devices (e.g., transistors coupled to voltage sources) and passive components (resistors, capacitors, inductors, etc.) that define the device's operation. Representative devices include microprocessors, controllers, device drivers, memory systems, converters and the like. The interconnects 114 may be metal pathways that connect circuit components 112 together. Typical interconnects 114 are made of aluminum, copper or other metals with low resistance.

The temperature sensor 120 may be a circuit element that records temperature of the device 100. In an embodiment, the temperature sensor 120 may include an impedance element (not shown) that is made of a common material as the interconnect 114. An impedance of the element may vary with temperature. The temperature sensor 120 may pass a current through the impedance element, measure a voltage across the element and thereby determine a temperature of the device 100.

Figure 2A:
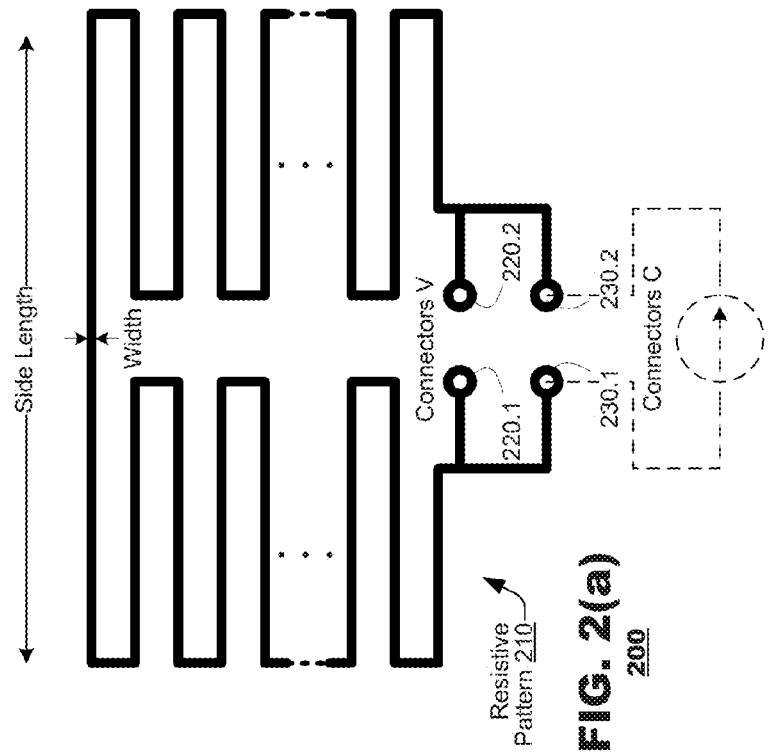
FIG. 2 illustrates an impedance element according to an embodiment of the present invention.

FIG. 2 illustrates an impedance element 200 according to an embodiment of the present invention. The impedance element 200 may include a metal laid out in a resistive pattern 210. The resistive pattern 210 may be aluminum metallization, copper metallization, or other known metallization materials. The resistive pattern 210 may be provided as a length of metal which is laid out in a serpentine pattern. Resistance of the impedance element 200 may depend on the geometry (length, width, and thickness) of the resistance pattern 210. When the impedance element is laid out in a serpentine pattern, its overall length will be based on the number of turns that the serpentine pattern includes and the length of a longest dimension. For example, a temperature sensor with a length of 16 mm may have an overall length about 1 m with a sufficient number of turns. The width of the resistance pattern may be controlled by the fabrication process within an acceptable error rate. For example, the width may be set at 3 μm. The thickness of the resistive pattern 210 may be less predictable depending on the accuracy of fabrication processes used when the device is manufactured as an integrated circuit. Variations in the thickness may be calibrated and then adjusted for, as discussed below.

The impedance element 200 may have a set of connectors 220.1, 220.2, 230.1, 230.2 provided at terminal ends of the resistive pattern 210. A first set of connectors V 220.1, 220.2 may provide for connection to a detector (not shown) to measure the voltage across the resistive pattern 210. A second set of connectors C 230.1, 230.2 may provide for connection to a current source (also not shown) to the resistive pattern 210. The connectors 220.1 220.2, 230.1, 230.2 may be unused bumps in the circuit portion of the electrical device.

Figure 3:
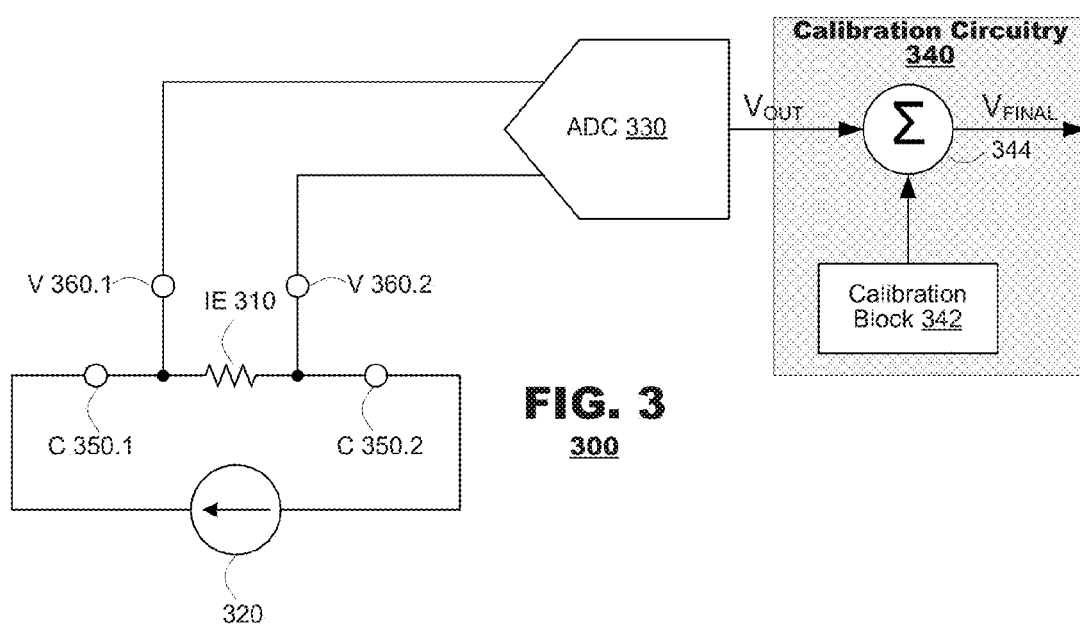
FIG. 3 is a circuit schematic of a temperature sensor according to an embodiment of the present invention.

FIG. 3 is a circuit schematic of a temperature sensor 300 according to an embodiment of the present invention. The temperature sensor 300 may include an impedance element 310 (shown as a resistor), a current source 320, an analog to digital converter (ADC) 330 and, optionally, a calibration circuit 340. The current source 320 may connect to the impedance element 310 via connectors C 350.1, 350.2 and may drive a known current through the impedance element 310. The ADC 330 may be coupled to the impedance element 310 via connectors V 360.1, 360.2. The ADC 330 may capture a voltage drop across the impedance element 310 that is created by the current and may digitize it ($V_{OUT}$). Over time, variations in temperature may induce variations in the impedance of the impedance element 310. These variations may be detected as corresponding variations in the output $V_{OUT}$ of the ADC 330.

In an embodiment, the temperature sensor 300 may include a calibration circuit 340 that includes a calibration block 342 and an adder 344. The calibration block 342 may include storage registers (not shown) to store corrective values representing deviations of the impedance element 310 from an ideal value. If resistance of the impedance element 310 deviates from norms due to manufacturing variations or other eccentricities, a corrective value may be stored in the calibration block 342, either as a positive or negative number, which may be added to the output $V_{OUT}$ of the ADC 330 to generate a final value $V_{FINAL}$ of the temperature sensor 300.

Figure 4:
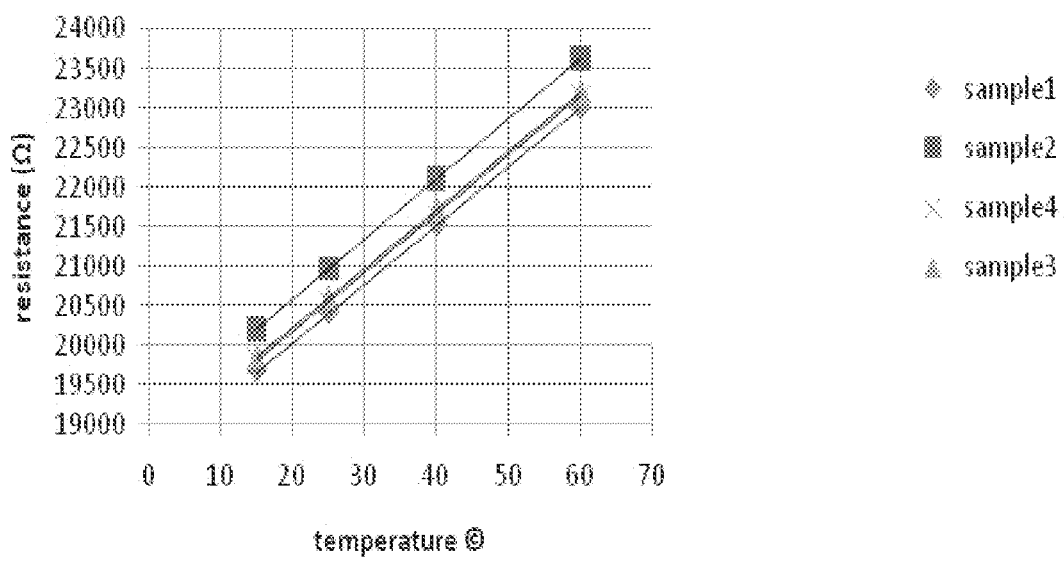
FIG. 4 illustrates graphs with simulated test results of different metallization that can be used with various embodiments of the present invention.
Figure 4:
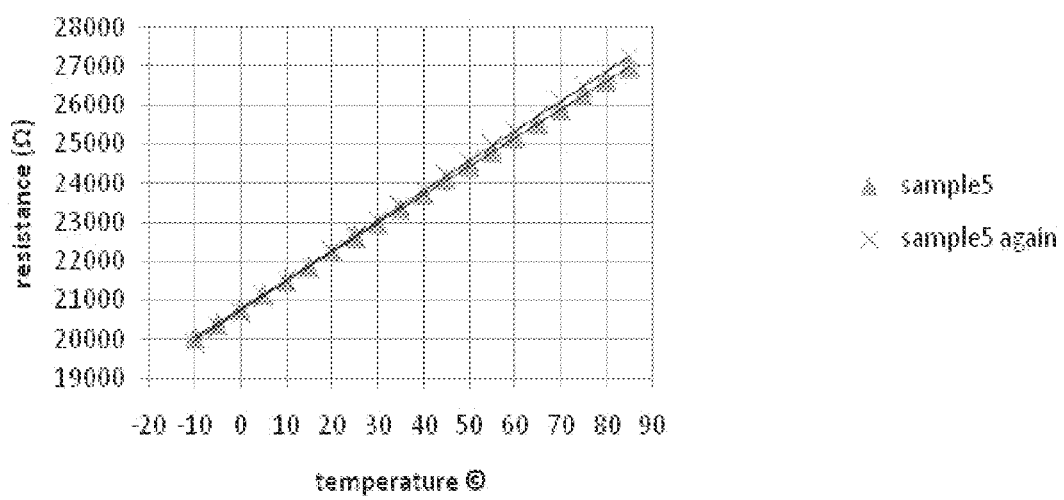

FIG. 4(a) illustrates simulated test results of four different samples of an aluminum metallization at a wafer level. The test results show four different data points corresponding to four temperature points and their measured resistance. As shown, each sample displays a direct linear relationship between resistance and temperature. Thus, as the temperature increases, the metallization resistance increases proportionally, which can be measured by the temperature sensors disclosed herein. FIG. 4(b) reiterates the linear relationship between resistance and temperature at a bench level. Accordingly, the measured resistance of a resistive pattern may be converted to a measured temperature value.

Therefore, the temperature sensor of the embodiments disclosed herein provides accurate temperature measurements with a simple and efficient design. The use of the interconnect materials in the temperature sensor saves on manufacturing costs because the temperature sensor can be fabricated in the same manufacturing process as the interconnect. Also, interconnect metallization material is relatively inexpensive; and as a result, so is the temperature sensor.

Metallization, such as aluminum metallization, has a resistance that is approximately proportional to absolute temperature (PTAT). The ratio of proportional change can also depend on the temperature range. For example, around ambient temperature (300° K), the metallization resistance changes 0.3% per Celsius degree change. The absolute resistance of the temperature sensor of the present invention may depend on the resistance pattern's geometry, which is the pattern's length, width, and thickness. Therefore, the temperature sensor may be calibrated based on these values. Modern lithography techniques allow the control of the length and width to be within a predetermined error rate, but cannot always control thickness to the same error rate. Thickness, for example, may have a variation of ±15%.

Relative temperature measurements (i.e., temperature changes) are not drastically affected by thickness variations. However, absolute temperature measurements are significantly affected by thickness variations. A calibration structure may be incorporated with the temperature sensor to account for the thickness variations to provide more accurate absolute temperature measurements. Links similar to structures provided for fusable link trimming may be integrated within the temperature sensor. The links can then be programmed through several methods including optical cutting, electrical blowing, or other known techniques.

Further, the number of links may depend on the desired accuracy of the temperature sensor. For example, if the desired accuracy is ±1° C. in an aluminum metallization, then the resistance accuracy is approximately 0.3% based on the above-mentioned aluminum metallization PTAT properties. Also, if the manufacturing thickness variation is ±15%, the temperature sensor programmability should in a range of 30% down to 0.3%. To encode this range, 7 bits of calibration may be sufficient. Once calibrated, the state of the links may be electrically readable to be used for adjustments for absolute temperature readings.

The links may be positioned in a variety of ways. For example, independent connections to each link may be provided where the links may connect to an internal array of resistors. Thus, an external measurement of the resistance of the internal array may indicate the state of the links.

The temperature sensor described herein may be used as a separate thermometer device. Alternatively, the temperature sensor may be incorporated into another device to measure temperature of the device and, thus, improve the device's performance. For example, the temperature sensor of the present invention may be incorporated into another sensor, such as an imaging sensor, to measure temperature of the sensor. The other sensor may provide the primary functionality of the device (i.e., image sensing), and the temperature sensor may improve the primary functionality when the primary sensor's component's performance varies with temperature. Thus, output of the temperature sensor provides a basis on which to calibrate or adjust signals output from the primary sensor.

In some applications, a single temperature sensor may be integrated into the primary sensor. In other applications, it may be beneficial to provide multiple temperature sensors integrated with the primary sensor. Again, the temperature sensors according to embodiments of the present invention are relatively inexpensive and space efficient. Therefore, integrating multiple temperature sensors can be done without increasing cost or size of the primary sensor. Multiple temperature sensors may improve the primary sensor's performance by providing temperature measurements for each multiple component of the primary sensor. For example, a temperature sensor may be provided for each pixel sensing element in an imaging sensor device.

Figure 5:
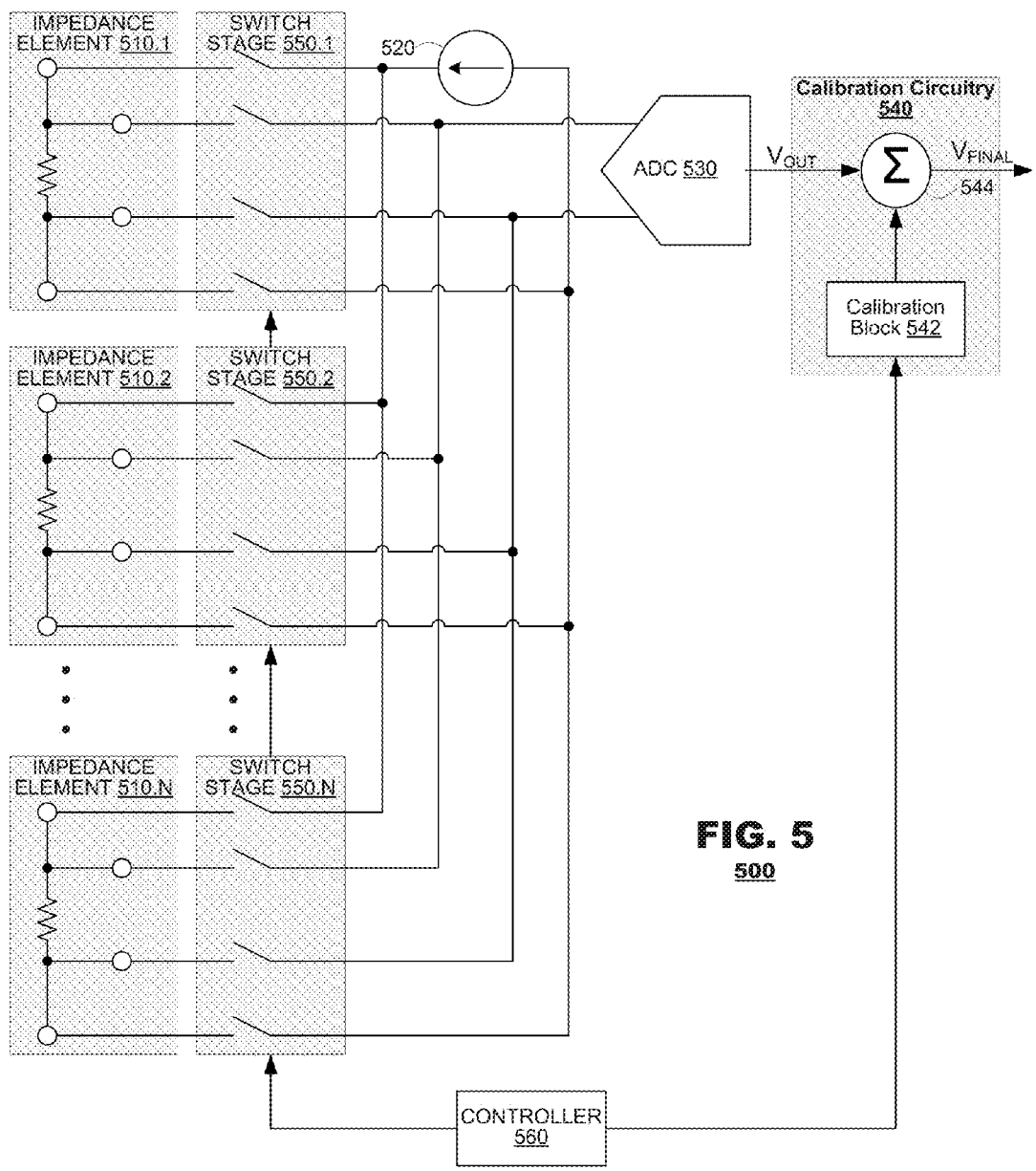
FIG. 5 is a circuit schematic of a temperature sensor according to another embodiment of the present invention.

FIG. 5 is a circuit schematic of a temperature sensor 500 according to an embodiment of the present invention. The temperature sensor 500 may include a plurality of impedance elements 510.1-510.N, a current source 520, an ADC 530, a calibration circuit 540, a plurality of switch stages 550.1-550.N and a controller 560. In this embodiment, the impedance elements 510.1-510.N may be distributed at various locations across an integrated circuit to measure temperature at those locations. The ADC 530 and current source 520 may connect to each impedance element 510.1, . . . , 510.N via a corresponding switch stage 550.1, . . . , 550.N. The controller 560 may control closure of the switch stages 550.1-550.N. When a given switch stage is closed (say, stage 550.2), the current source 520 may drive a current through the impedance element 510.2 associated with the switch stage 550.2 and the ADC 530 may digitize a voltage drop across the impedance element 510.2. Over time, variations in temperature may induce variations in the impedance of the impedance element 510.2, which may be detected as corresponding variations in the digitized voltage across the impedance element 510.2.

As illustrated, the temperature sensor 500 may include a calibration circuit 540 that includes a calibration block 542 and an adder 544. The calibration block 542 may include storage registers (not shown) to store corrective values associated with each impedance element 510.1, . . . , 510.N. The corrective value may include components that accommodate variation among the lengths of interconnect extending between the current source 520 and each impedance element 510.1, . . . , 510.N. The corrective values also may include components representing deviations of each impedance element 510.1, . . . , 510.N from ideal values due to manufacturing variations or other eccentricities. During operation, when the controller 560 closes switches of a selected switch stage 550.2, the controller 560 also may identify the selected switch stage to the calibration circuit 540, which causes an appropriate corrective value to be retrieved from the calibration block and added to the ADC output $V_{OUT}$ to generate a final value $V_{FINAL}$ of the temperature sensor 500.

Figure 6:
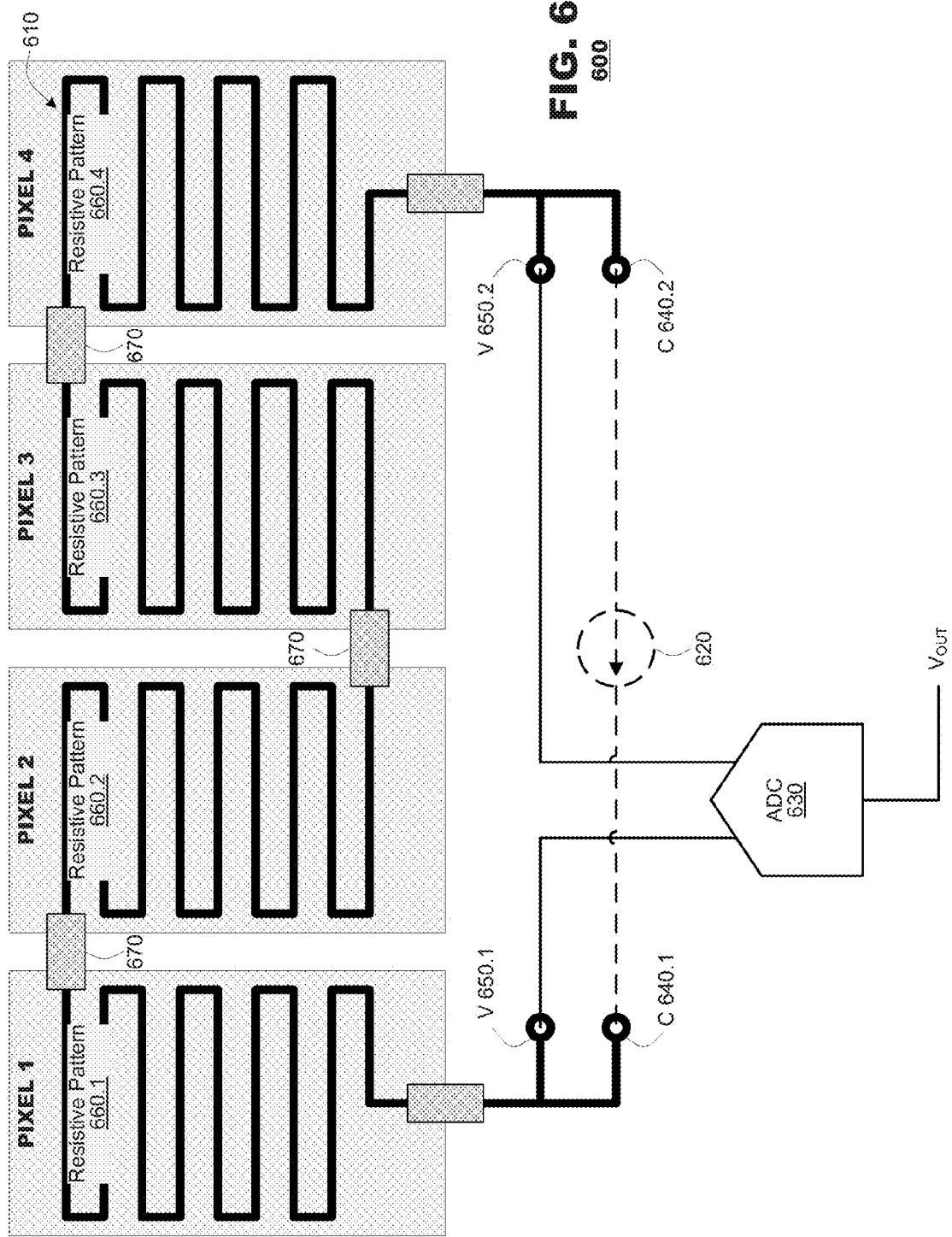
FIG. 6 illustrates a temperature sensor according to an embodiment of the present invention.

FIG. 6 illustrates a temperature sensor 600 according to an embodiment of the present invention. The temperature sensor 600 may include an impedance element 610, a current source 620 and an ADC 630. The current source 620 may connect to the impedance element 610 by a pair of connectors C 640.1, 640.2. The ADC 630 may connect to the impedance element 610 by a second pair of connectors V 650.1, 650.2.

As in prior embodiments, the impedance element 610 may provide a length of metal which is laid out in a serpentine pattern. In the embodiment illustrated in FIG. 6, the impedance element may be divided into a plurality of segmented resistive patterns 660.1-660.4. The different portions may be associated with different pixels of a coupled imaging sensor.

The impedance element 610 may be made of a common material as the materials used for interconnect of the imaging sensor. Thus, the impedance element 610 may be made of aluminum metallization, copper metallization, or other known metallization materials. Resistance of the impedance element 610 may depend on the geometry (length, width, and thickness) of the resistive pattern segments 660.1-660.4. The length of the impedance element 610 would be the total length of material end to end and thus depends on the number of resistive patterns 660.1-660.4, the number of turns in each resistive pattern 660.1, 660.2, etc., and dimensions of each resistive pattern 660.1, 660.2, etc. The thickness and width of the impedance element 610 may be controlled by the fabrication process but, as described, material thickness typically is less predictable than width due to inaccuracies of such processes. As in the prior embodiment, a temperature sensor may include components (not shown in FIG. 6) to calibrate ADC output $V_{OUT}$ for process-induced variation.

In an embodiment, a temperature sensor 600 may include isolation connectors 670 that couple the resistive pattern segments 660.1-660.4 of an impedance element 610 together. The isolation connectors 670 may insure electrical connectivity and across the different segments 660.1-660.4, especially where the different segments are located across uneven topography on a substrate.

In another embodiment, the temperature sensor 600 may include multiple external connections (not shown) to allow temperature measurements to be taken at various locations across the impedance element 610. For example, the temperature seen at each pixel may be individually measured by the temperature sensor 600.

One example of an image sensing device whose performance may vary with temperature is a photodiode array. Photodiode arrays are often used in computed-tomography medical imaging devices. In these devices, x-rays pass through the patient and are attenuated by the patient's internal tissues (or the lack thereof). A scintillator surface, placed behind the patient, captures the attenuated x-rays and converts the x-rays to wavelengths that can be detected by a photodiode. A photodiode array produces an output current based on the converted signal. The output currents from each photodiode pixels are measured to generate an image representing the internal tissue within the patient. The photodiodes' operation, however, can vary with the temperature leading to inaccurate image results. Therefore, integrating temperature sensor(s) of the present invention into the photodiode array can improve the photodiode array's performance and provide a more accurate representation of the patient's internal tissue because the photodiode array's currents may be adjusted or calibrated according to the measured temperature.

Figure 7:
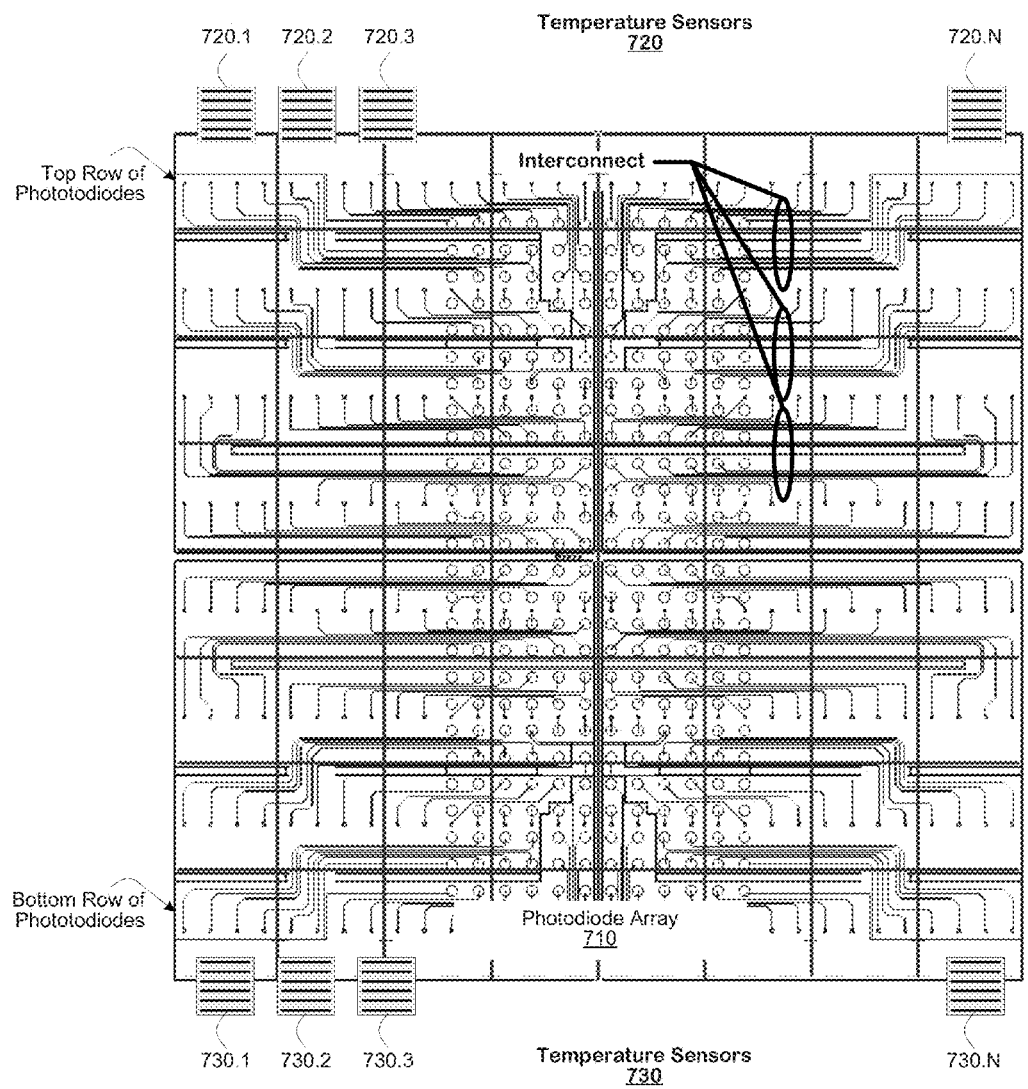
FIG. 7 illustrates an integrated circuit according to an embodiment of the present invention.

FIG. 7 illustrates an integrated circuit 700 according to another embodiment of the present invention. FIG. 7 illustrates the integrated circuit's backside where the integrated circuit 700 is a photodiode array with temperature sensors integrated thereon. The integrated circuit 700 may include a photodiode array 710 and top and bottom temperature sensors 720.1-720.n (top) and 730.1-730.n (bottom). FIG. 7 illustrates the backside connections of the photodiode array fabricated on the front side of the integrated circuit 700. The photodiode array 710 components are connected to each other by interconnect traces.

The top temperature sensors 720.1-720.N may be located above a top row of photodiodes on the array 710. Each temperature sensor 720.1, . . . , 720.N may include a serpentine pattern as described above in other embodiments. The serpentine pattern may be made of the same metal as is used in the interconnect in the photodiode array 710. Alternatively, a single temperature sensor 720 may be formed from multiple individual serpentine patterns across photodiode cells where the serpentine patterns may connected in series as described above in the discussion of FIG. 6.

The bottom temperature sensors 730.1-730.N may be located below the bottom row of photodiodes on the array 710. Each temperature sensor 730.1, . . . , 730.N may include a serpentine pattern as described above in other embodiments. The serpentine pattern may be made of the same metal as is used in the interconnect in the photodiode array 710. Alternatively, a single temperature sensor 730 may be formed from multiple individual serpentine patterns across photodiode cells where the serpentine patterns may connected in series as described above in the discussion of FIG. 6.

According to another embodiment of the present invention, a temperature sensor may be integrated into a disposable element such as a single use medical testing strip. For example, the temperature sensor may be integrated into a glucose meter strip or other chemical sensors. The temperature sensor may be placed in close proximity to a chemical reactive portion and measure the temperature. The disposable element may then transmit the temperature measurement to the strip reader along with the chemical reaction measurement to correct for errors caused by temperature changes. For example, every ° C. degree temperature error in a glucose meter can create a few percent error in the blood glucose measurement (BGM). Thus, temperature readings close to the chemical reactive portion may lead to more accurate chemical readings.

To integrate a temperate sensor in close proximity to the chemical reactive portion in a single use device, the temperature sensor must be relatively inexpensive to keep manufacturing costs down. Thus, the temperature sensor according to embodiments of the present invention described herein is ideal to be integrated into a single use disposable device.

Figure 8:
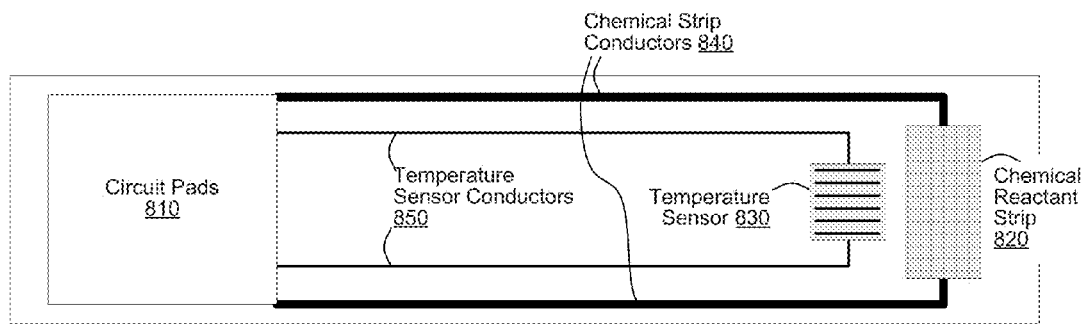
FIG. 8 illustrates a chemical testing strip according to an embodiment of the present invention.

FIG. 8 illustrates a chemical testing strip with an embedded temperature sensor according to an embodiment of the present invention. The chemical testing strip 800 may include circuit pads 810, a chemical reactant strip 820, a temperature sensor 830 and conductors 840, 850. All components of the testing strip 800 may be provided on a substrate that is electrically and chemically inert for the applications to which the testing strip 800 will be used. The chemical reactant strip 820 may be manufactured of a material that reacts with a test subject and generates an electrical response therefrom based on the chemical composition of the test subject. For example, the chemical reactant strip 820 may test blood glucose levels. Electrical responses (e.g., currents) may be conducted from the chemical reactant strip 820 to circuit pads 810 of the testing strip 800 via chemical strip conductors 840.

The temperature sensor 830 may be provided in proximity to the chemical reactant strip 820 to be at a similar temperature as the reactant strip 820. The temperature sensor 830 may be provided on a silicon die that is mounted on or otherwise attached to a substrate of the chemical testing strip 800. Contacts (not shown) of the temperature sensor 830 may be connected to circuit pads 810 of the testing strip via temperature sensor conductors 850.

In an embodiment of the present invention, the chemical reactant strip 820 may be provided as a first type of metal, and the conductors 840, 850 may be provided as a second type of metal. For example, the chemical reactant strip 820 may be provided as an inert metal (e.g., gold or palladium) to be more conducive to a desired chemical reaction, and the conductors 840, 850 may be provided as a more conventional metal (i.e., lower cost) such as aluminum or copper.

The temperature sensor 830 may be attached to the chemical testing strip 800 via an assembly process such as wirebonding or flip chip technique (e.g., conductive epoxy). The temperature sensor conductor 850 may be provided with the same metal as the chemical strip conductor 840 and, therefore, may be a lower cost metal in the same assembly process as the temperature sensor attachment. Furthermore, in the same assembly process, the circuit pads 810 may also be provided with the above-mentioned lower cost metal. Therefore, embodiments of the present invention may significantly reduce the manufacturing cost of the chemical testing strip 800.

Figure 9:
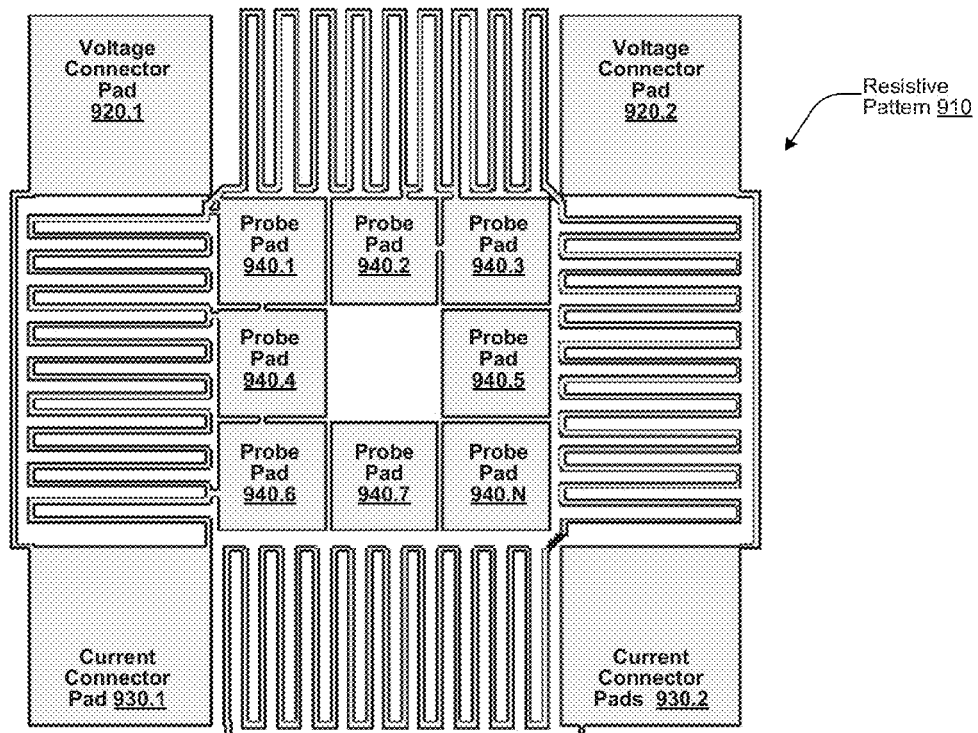
FIG. 9 illustrates an impedance element according to another embodiment of the present invention.

FIG. 9 illustrates an impedance element 900 according to another embodiment of the present invention. The temperature sensor 900 may include a resistive pattern 910, a pair of voltage connector pads 920.1, 920.2, a pair of current connector pads 930.1, 930.2 and a plurality of probe pads 940.1-940.N.

The resistive pattern 910 may provide a length of metal which is provided in a serpentine pattern. The resistive pattern 910 may be provided in shapes other than as shown in FIG. 9, for example, a spiral, fractal or similarly-shaped patterns. The resistive pattern 910 may be aluminum metallization, copper metallization, or other known metallization materials. Resistance of the impedance element 900 may depend on the length, width, and thickness of the resistive pattern 910. The length of a serpentine pattern is the total length of the serpentine pattern end to end and thus depends on the number of turns in the serpentine pattern and the temperature sensor's length. The width of the resistive pattern 910 may be controlled by a fabrication process but, as discussed, thickness of the resistive pattern 910 may be less predictable depending on the accuracy of the fabrication process. Variations in the thickness may be calibrated and then adjusted for accordingly.

The voltage connector pads 920.1, 920.2 may provide contacts for connection to an ADC (not shown) to measure a voltage across the impedance element. The current connector pads 930.1, 930.2 may provide contacts for connection to a current source (also not shown) to drive a current through the impedance element 900. The probe pads 940.1-940.N may be used for calibration purposes to provide contacts for measurement of impedance through different segments of the resistive pattern 910 and to determine any variations from ideal values. The impedance element 900 may be fabricated on a single silicon wafer.

According to another embodiment of the present invention, a transparent code may be integrated into a device via metallization resistance. Thus, a binary code may be programmed via the resistance values. When the resistance is measured, the binary code may then be conveyed.

Figure 10:
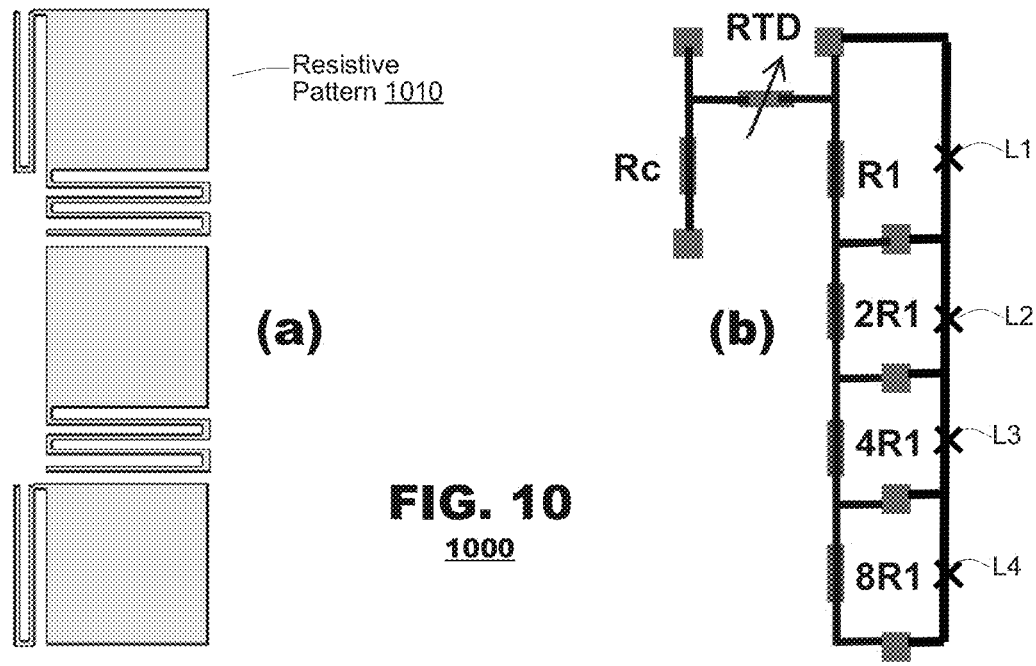
FIG. 10 a device with a data-encoded resistance pattern according to an embodiment of the present invention.

FIG. 10(a) illustrates a transparent coding section according to an embodiment of the present invention. FIG. 10(b) illustrates its circuit schematic equivalent and FIG. 10(c) illustrates a system for reading the coding section. The transparent coding section 1000 may include a resistive pattern 1010 formed of an aluminum metallization, copper metallization, or other known metallization materials. Further, the resistive pattern 1010 may be 4 binary weighted discrete resistors (R1, 2R1, 4R1, 8R1). The resistors may be coupled via links L1-L4 that may be severed to program an overall resistance to the resistive pattern 1010. The links L1-L4 may be severed by laser trimming, electrical fusing, or other known techniques. Thus, the resistive pattern 1010 may carry a 4 bit digital code, which is a transparent code.

As illustrated in FIG. 10(c), the resistive pattern 1010 may be read for it's code by a system that includes a current source 1020 and an ADC 1030. The resistive pattern 1010 may have a pair of contacts 1040.1, 1040.2 on opposite ends of the resistive pattern 1010 for connection to the current source 1020. The resistive pattern 1010 may have a second pair of contacts 1050.1, 1050.2 on opposite ends of the resistive pattern 1010 for connection to the ADC 1030. Resistance of the pattern 1010 may be determined by the coding applied to the pattern via the severed links L1-L4 throughout the pattern. Thus, when a predetermined current is driven through the resistive pattern 1010, the ADC 1030 may digitize a voltage developed across the pattern 1010 from which the code may be derived. In the embodiment of FIG. 10(c), the ADC 1030 need only have a bitwidth corresponding to the number of weighted resistors to be used in the resistive pattern (e.g., a 4 bit ADC for a resistive pattern with 4 binary weighted resistors, a 6 bit ADC for a pattern with 6 binary weighted resistors). In other embodiments, it may be useful to provide an extra bit of resolution merely for error resiliency purposes (e.g., an N+1 bit ADC for a pattern with N binary weighted resistors).

Figure 11:
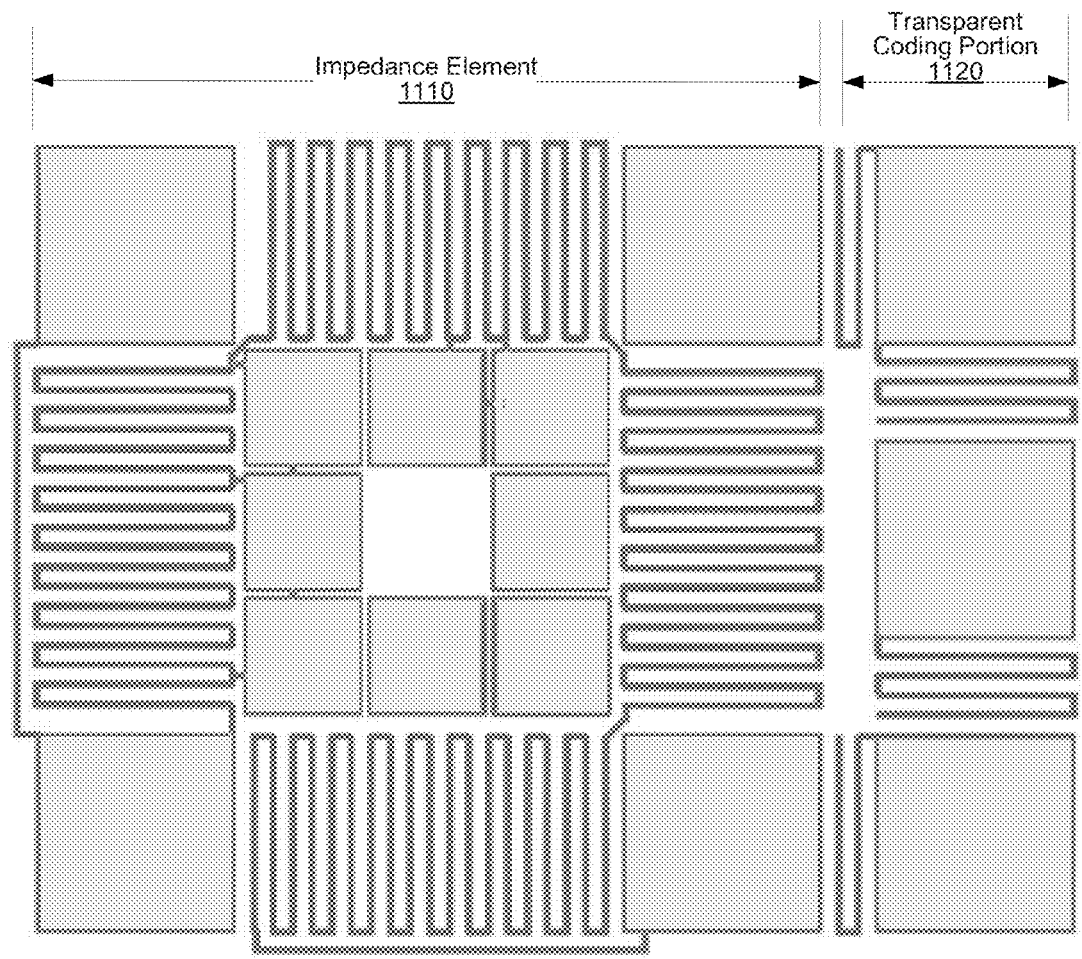
FIG. 11 illustrates a device having both an impedance element and a data-encoded resistance pattern according to an embodiment of the present invention.

Transparent coding may be integrated into the various embodiments of temperature sensors described herein. FIG. 11 illustrates a device 1100 having an impedance element 1110 with a transparent coding portion 1120 provided on a common substrate. The impedance element 1110 may be constructed according to the principles of the foregoing embodiments and may be coupled to current sources and ADCs (not shown) as discussed. The transparent coding portion 1120 may include a binary code or redundant coding. The binary code may pertain to some information about a system that the device 1100 is incorporated within. The binary code may be an error detection code, an error correction code, a date code such as an expiration date for a medical strip, a manufacturer code, a distribution code, a chemical code, etc. The code may be programmed by setting the resistance between the voltage and current connector pads as shown in the transparent coding portion 1120 as their value is not critical for the temperature measurement. The device 1100 finds application on a single use disposable device such as a glucose meter strip.

Several embodiments of the present invention are specifically illustrated and described herein. However, it will be appreciated that modifications and variations of the present invention are covered by the above teachings. Specific temperature sensor implementations as described herein are for illustrative purposes only. Other implementations are also within the scope of the present invention. For example, the temperature sensor embodiments described herein may be integrated into printed circuit boards (PCBs) for devices such as smart-phones to continuously monitor the temperature of the PCBs, medical thermometers to compensate for their infrared sensor.

In other instances, well known operations, components and circuits have not been described in detail so as not to obscure the embodiments. It can be appreciated that the specific structural and functional details disclosed herein may be representative and do not necessarily limit the scope of the embodiments.

We claim:

1. An integrated circuit, comprising:
   a plurality of electrical components provided in a substrate and interconnected by an interconnect metal, and
   a temperature sensor, comprising:
   an impedance element having a length of metal made of the interconnect metal and having pairs of contacts at opposite ends of the length, wherein the impedance element has a folded serpentine pattern,
   a current source connected between a first set of the contacts at opposite ends of the length, and
   an analog-to-digital converter connected between a second set of the contacts at opposite ends of the length.

2. The integrated circuit of claim 1, further comprising:
   a plurality of other impedance elements, each having its own length of metal made of the interconnect metal and having pairs of contacts at opposite ends of its length,
   wherein the current source is connected to each impedance element by a first pair of switches, the current source connected between a first set of the contacts at opposite ends of the respective impedance element's length,
   wherein the analog-to-digital converter is connected to each impedance element by a second pair of switches, the analog-to-digital converter connected between a second set of the contacts at opposite ends of the respective impedance element's length.

3. The integrated circuit of claim 2, wherein the impedance elements are spatially distributed across the substrate.

4. The integrated circuit of claim 2, further comprising:
   a calibration block storing calibration values representing impedance differences among the impedance element due to their location on the substrate, and
   an adder coupled to an output of the analog-to-digital converter and to an output of the calibration block.

5. The integrated circuit of claim 1, further comprising:
   a calibration block storing calibration values associated with an impedance of the impedance element, and
   an adder coupled to an output of the analog-to-digital converter and to an output of the calibration block.

6. The integrated circuit of claim 1, wherein the substrate has an array of pixel circuits formed thereon and portions of a common impedance element extends through multiple pixel circuits.

7. The integrated circuit of claim 1, wherein the substrate has an array of pixel circuits formed thereon and separate impedance elements are provided for separate pixel circuits.

8. The integrated circuit of claim 1, wherein the substrate has an array of pixel circuits formed thereon and separate impedance elements are aligned with separate rows of pixel circuits.

9. The integrated circuit of claim 1, wherein the substrate has a chemical reactant strip formed thereon and the impedance element is provided adjacent to the chemical reactant strip.

10. The integrated circuit of claim 1, further comprising a second impedance element having a serpentine resistive pattern and a plurality of fusable links interconnecting portions of the resistive pattern.

11. An integrated circuit comprising:
    a plurality of electrical components provided in a substrate and interconnected by an interconnect metal;
    a temperature sensor, comprising:
    an impedance element having a length of metal made of the interconnect metal and having pairs of contacts at opposite ends of the length,
    a current source connected between a first set of the contacts at opposite ends of the length, and
    an analog-to-digital converter connected between a second set of the contacts at opposite ends of the length; and
    a reactant module provided in the substrate and coupled to the plurality of electrical components.

12. The integrated circuit of claim 11, wherein the current source and analog-to-digital converter are provided in the substrate.

13. The integrated circuit of claim 11, wherein the current source and analog-to-digital converter are provided exterior to the substrate.

14. The integrated circuit of claim 11, further comprising a second impedance element having a serpentine resistive pattern and a plurality of fusable links interconnecting portions of the resistive pattern.

15. The integrated circuit of claim 14, wherein select fusable links are broken to encode data into the resistive pattern.

16. The integrated circuit of claim 11, further comprising:
    a calibration block storing calibration values associated with an impedance of the impedance element, and
    an adder coupled to an output of the analog-to-digital converter and to an output of the calibration block.

* * * * *